Patented Aug. 6, 1946

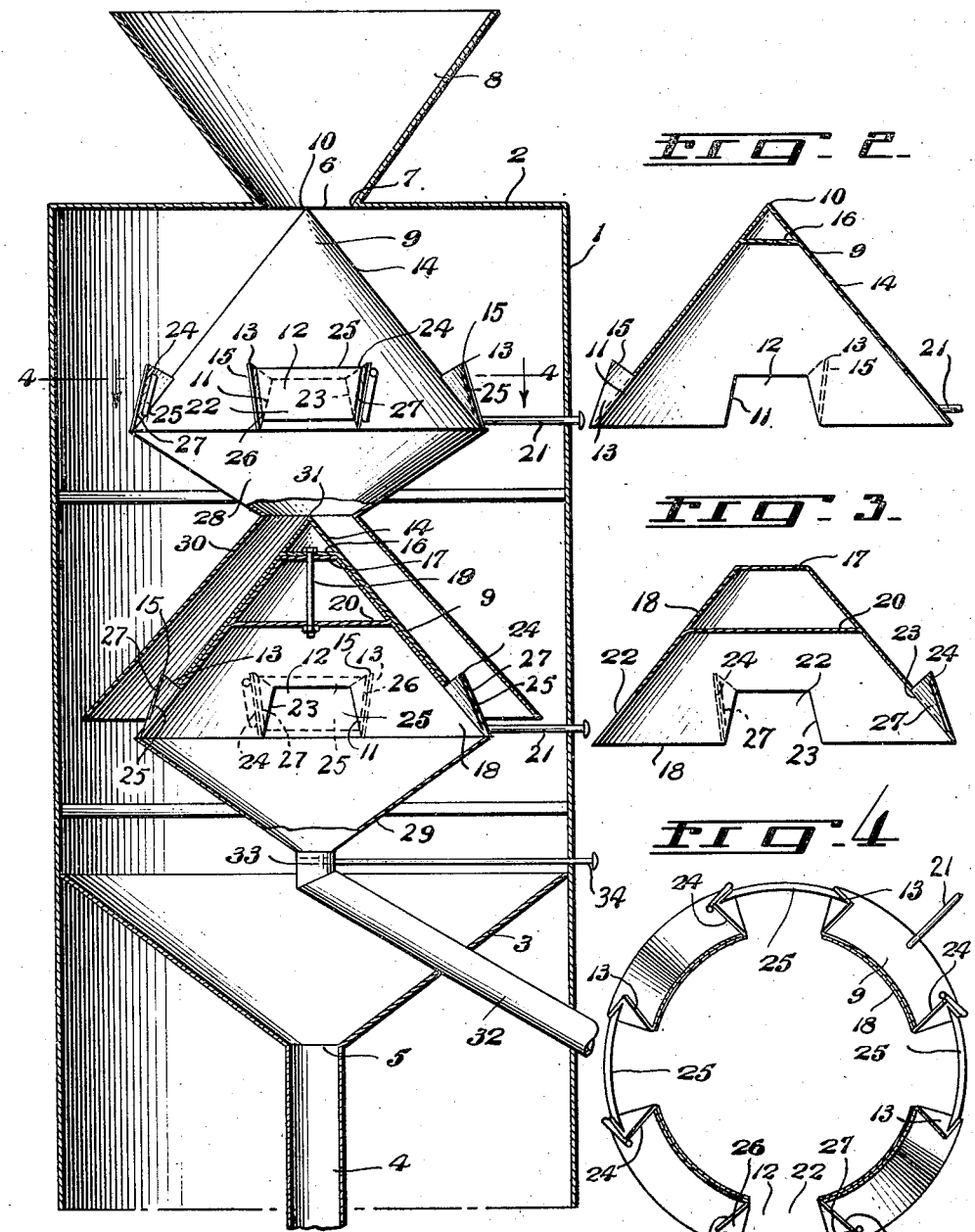

2,405,486

UNITED STATES PATENT OFFICE 2,405,486

SAMPLING MACHINE

Philip J. Bauer, Basic Township, Clark County, Nev.

Application March 29, 1943, Serial No. 480,987

1 Claim. (Cl. 73—421)

My invention relates to improvements in sampling machines in which a movable cone with splitters and receptive openings for bulk material operate in conjunction with a fixed cone with splitters and receptive openings for bulk materials; and the objects of my improvement are, first, to provide a homogeneous separation of bulk material; second, to afford facilities for the adjustment of the cones and splitters; and third to remove from a bulk material a predetermined homogeneous amount.

I attain these objects by mechanism illustrated in the accompanying drawing, in which—

Fig. 1 is a longitudinal sectional view of the splitting machine; Fig. 2 is a vertical sectional view of the movable cone with attached splitters; Fig. 3 is a vertical sectional view of the fixed cone and attached splitters; and Fig. 4 is a sectional view of the splitters taken along the line 4—4 in Fig. 1.

Similar numerals refer to similar parts throughout the several views.

In Fig. 1, there is secured to the round container 1 the round container top 2 and the funnel base 3; and the discharge pipe 4 is secured to the funnel base 3 at the hole 5 in the funnel base 3. In the center of the round container top 2 is the round hole 6 and secured to the edge 7 of the round hole 6 is the top funnel 8. The upper hollow movable cone 9 has its apex 10 in the center of the round hole 6. To the left hand edges 11, 11, 11, 11 of the angular holes 12, 12, 12, 12 in the upper hollow movable cone 9 are secured the movable splitters 13, 13, 13, 13 and equally spaced one from the other, and the height of each of the angular holes 12, 12, 12, 12 on the upper hollow movable cone 9 is equal to the length of each of the movable splitters 13, 13, 13, 13 and the length of each of the angular holes 12, 12, 12, 12 is equal to one-half of the distance between two movable splitters 13, 13 in sequence. The degree of angle of the surface 14 of the upper hollow movable cone 9 with the horizontal is fifty degrees, and the upper edges 15, 15, 15, 15 of the movable splitters 13, 13, 13, 13 are at fifty degree angle to the surface 14.

In Fig. 2. on the inside of the upper hollow movable cone 9 is secured the disc 16 near the apex 10; and the disc 16 supports the upper hollow movable cone 9 on the round flat surface 17 (Fig. 3) of the fixed hollow cone 18 (Fig. 3). The upper hollow movable cone 9 is just enough larger than the fixed hollow cone 18 (Fig. 3) to have free movement thereon, and the upper hollow movable cone 9 is secured to the fixed hollow cone 18 by the bolt 19 through the disc 16 and the secured support arm 20 in the fixed hollow cone 18; and the upper hollow movable cone 9 on the fixed hollow cone 18 is movable by the control rod 21 (Fig. 1) secured to the upper hollow movable cone 9.

In the fixed hollow cone 18 are the angular holes 22, 22, 22, 22 of the same size, shape and spaced as the angular holes 12, 12, 12, 12, and to the right hand edges 23, 23, 23, 23 of the angular holes 22, 22, 22, 22 of the fixed hollow cone 18 are secured the fixed splitters 24, 24, 24, 24 that are of the same size and shape as the movable splitters 13, 13, 13, 13 and spaced on the fixed hollow cone 18 in the same manner from the right hand edges 23, 23, 23, 23, and with the surface of the fixed hollow cone 18 having a fifty degree pitch with the horizontal and the fixed splitters 24, 24, 24, 24 set at a fifty degree angle with the surface of the fixed hollow cone 18. The angular holes 12, 12, 12, 12 in the upper hollow movable cone 9 overlap with the angular holes 22, 22, 22, 22 in the fixed hollow cone 18 as the upper hollow movable cone 9 is moved on the fixed hollow cone 18, and the angular overlapping of the holes 12, 12, 12, 12, 22, 22, 22, 22 may be either decreased or increased by the movement, and the amount of overlapping of each of the angular holes 12, 12, 12, 12, 22, 22, 22, 22 determines the "split" to be taken from the bulk material, by the splitter sets 13—24, 13—24, 13—24, 13—24. The springs 25, 25, 25, 25 are secured to the edges 26, 26, 26, 26 on the movable splitters 13, 13, 13, 13 and as the upper hollow movable cone 9 is advanced by the control rod 21 the springs 25, 25, 25, 25 advance through the slots 27, 27, 27, 27 in the fixed splitters 24, 24, 24, 24 and curl outward from the upper hollow movable cone 9 so as not to interfere with the movement of the bulk material, and at the same time to aid the bulk material to enter the angular holes 12—22, 12—22, 12—22, 12—22. The bulk material enters the sampling machine through the top funnel 8 and moves down the surface 14 and the portion of the bulk material passing between the splitter sets 13—24, 13—24, 13—24, 13—24 moves through the angular holes 12—22, 12—22, 12—22, 12—22 into the hollow cone base 28 that is secured to the fixed hollow cone 18, and the balance of the bulk material falls to the lower funnel 3. The bulk material entering the hollow cone base 28 is called the "split" or "cut," of the bulk material. The foregoing illustration is for one sampling machine, and when further "splits" are desired two or more sampling machines are used, each machine below the other and each machine reducing the "split"; and as illustrated in Fig. 1, the "split" is reduced by the lower unit 29, and the apron 30 is secured to the hollow cone base 28 and prevents the bulk material falling off the upper hollow movable cone 9 of the lower unit 29; and the "split" of bulk material passing through the hollow cone base 28 moves on the lower unit 29 at its apex 31 and thereafter the movement of the "split" bulk material on the lower unit 29 is the same as the movement of the bulk material first described, and the "split" taken from the split bulk material moves into the storage bin pipe 32, and the remaining portion of the split bulk material into the funnel base 3.

The sampling machine may be used as a mixer of bulk material by the movement of the bulk materials to be mixed through the machine as described for "splitting" to the valve 33 that is operated by the control rod 34, and by the valve 33 the "splits" moves into the funnel base 3 with the bulk material passing off the machine, as described.

The spring 25, 25, 25, 25 is of spring steel, and is as wide as the left hand edge 11 of the movable splitter 13, and it is to assist the bulk material to enter the angular hole 12—22, 12—22, 12—22, 12—22; and also the spring 25, 25, 25, 25 does not interfere with the gravity flow of the bulk material that passes to the right side of the angular hole 12—22, 12—22, 12—22, 12—22.

The sampling machine may be constructed to "split" from a bulk material any per cent desired, predetermined by the number of splitters per cone and the size of the angular holes in the cones and the number of cone units. As illustrated the splitters on each cone unit, when wide open, will cut one-half of the bulk material from the whole; and when the splitters are one-half open they will cut one-fourth of the bulk material from the whole.

I have found by experiment that the best results in the use of the sampling machine is obtained when the surface of the cone is at fifty degrees pitch and the splitters are set at fifty degrees angle to the cone surface.

I have used an angular hole in the cone, the described shape splitter and internal movement of the "split" for the purpose of illustrating my invention, and I do not limit myself as illustrated.

I claim:

The combination, in a sampling machine, of a movable cone having spaced openings therein and a flange on one edge of each opening to form a splitter, a stationary cone having openings of the same configuration and correspondingly spaced as the openings in the movable cone and a flange on one edge of each opening to form a splitter, the splitters of the stationary cone being on the edges of the openings that are oppositely related to the edges of the openings on which the splitters on the movable cone are located, the movable cone being seated on the stationary cone in a nested relationship with the splitters of the stationary cone extending through the openings of the movable cone, means to rotate the movable cone whereby the openings may be brought in and out of registration to vary the size thereof, a funnel for feeding material over the movable cone, the apex of the movable cone being centrally located at the discharge opening of the funnel, and a receiver in the form of an inverted truncated cone located beneath the stationary cone to receive material discharged through the registered openings of the cones.

PHILIP J. BAUER.